(No Model.) 4 Sheets—Sheet 1.
C. H. BURCKETT.
MANUFACTURE OF HORSESHOE NAILS.
No. 371,171. Patented Oct. 11, 1887.
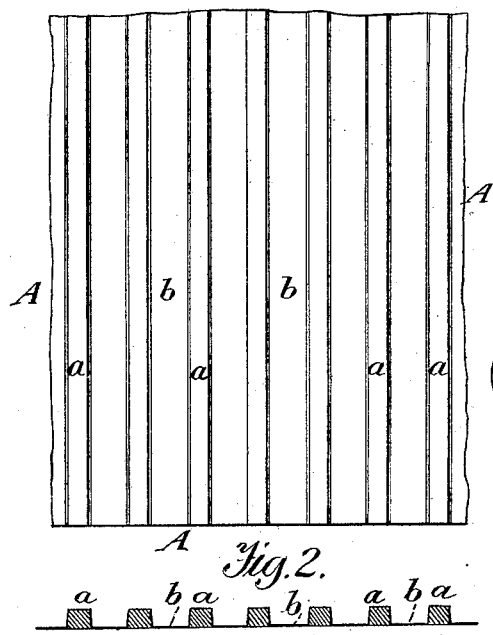
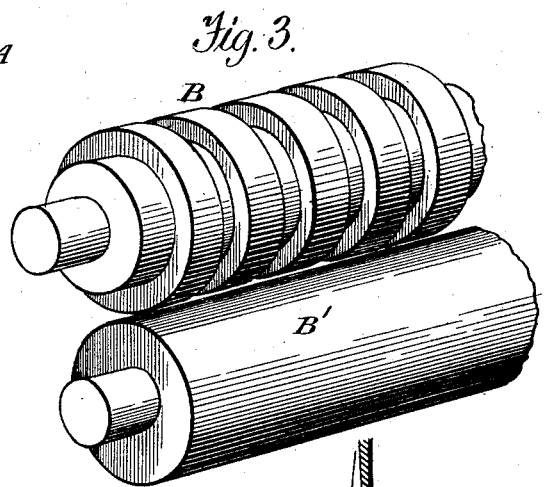
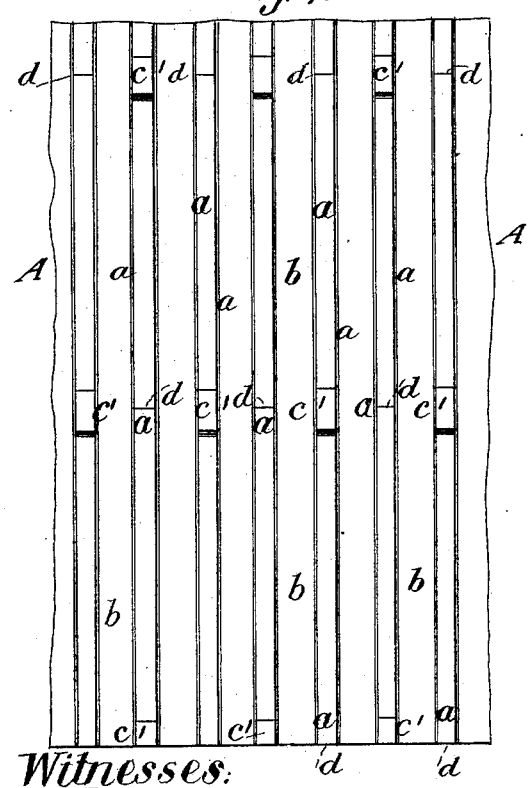
Witnesses:
A. Ruppert.
G. Frere Hint
Inventor:
Charles H. Burckett,
by G. H. W. T. Howard (No Model.) 4 Sheets—Sheet 2.
C. H. BURCKETT.
MANUFACTURE OF HORSESHOE NAILS.
No. 371,171. Patented Oct. 11, 1887.
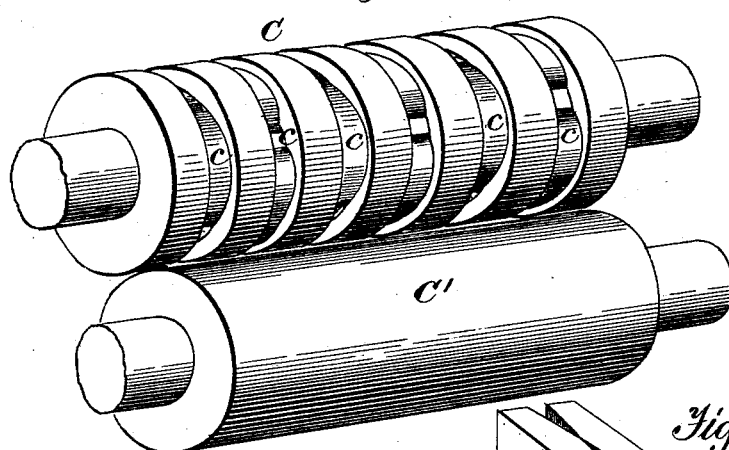
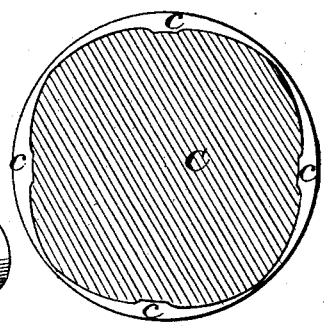
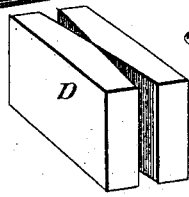
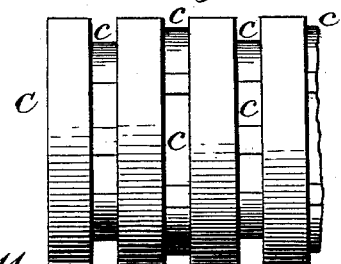
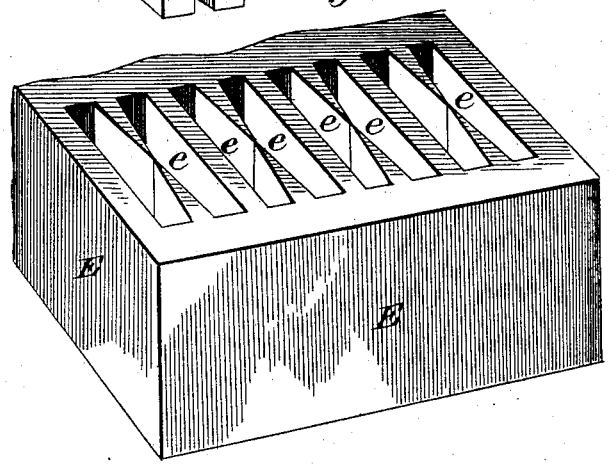
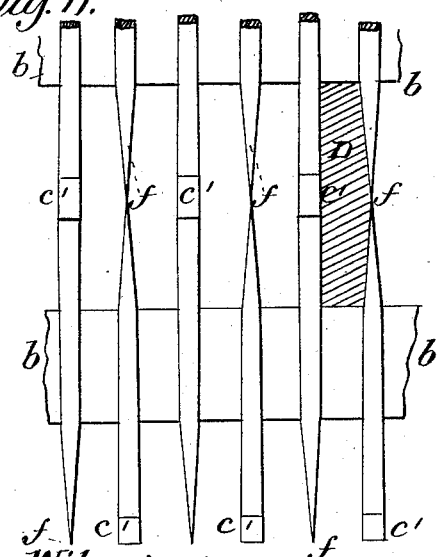
Witnesses:
A. Ruppert.
G. Irene Flint
Inventor:
Charles H. Burckett,
by ...... attys.
N. PETERS, Photo-Lithographer, Washington, D. C.

(No Model.) 4 Sheets—Sheet 3.
C. H. BURCKETT.
MANUFACTURE OF HORSESHOE NAILS.
No. 371,171. Patented Oct. 11, 1887.
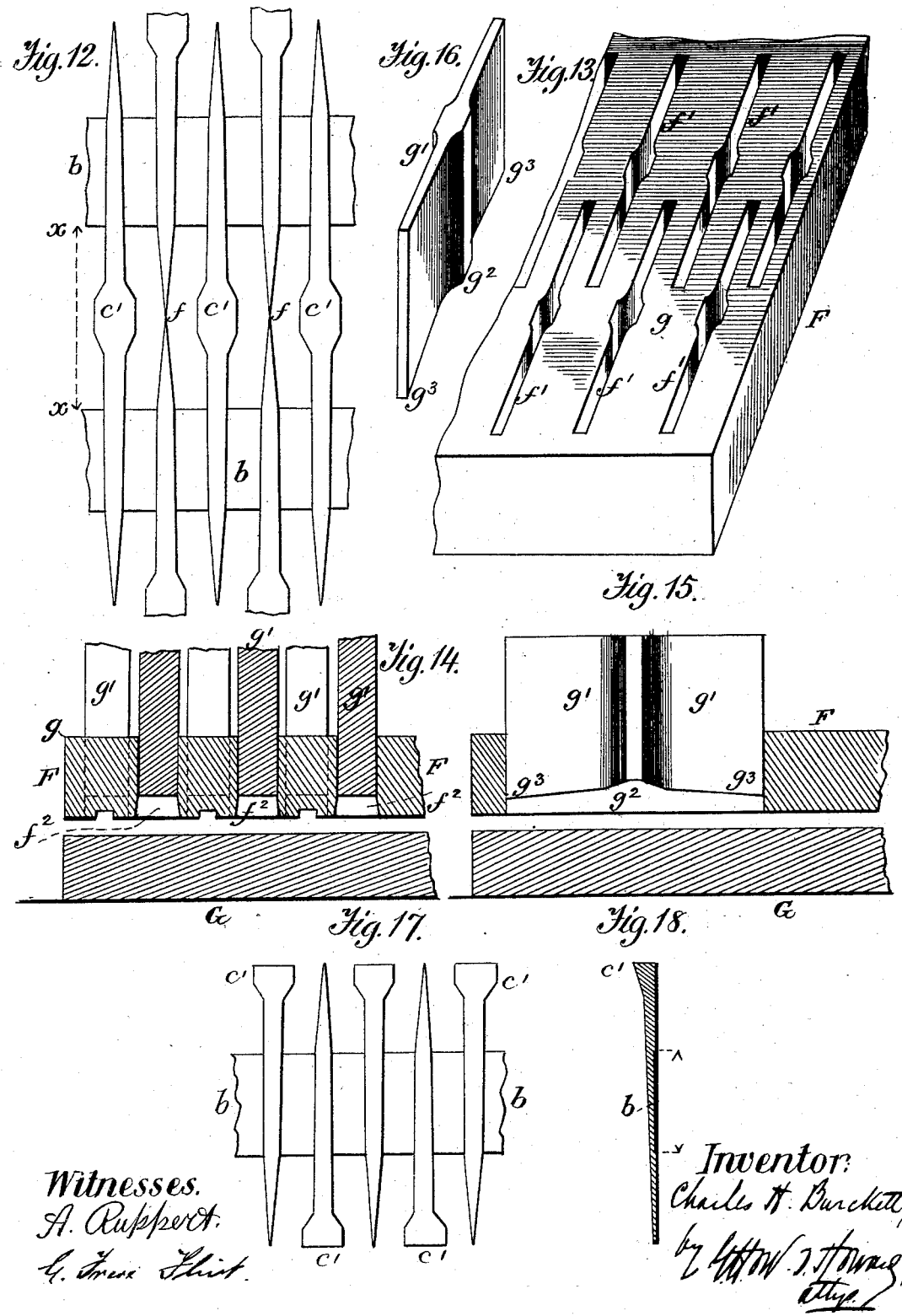
Witnesses.
A. Ruppert
G. Trese Flint
Inventor:
Charles H. Burckett (No Model.) 4 Sheets—Sheet 4.
C. H. BURCKETT.
MANUFACTURE OF HORSESHOE NAILS.
No. 371,171. Patented Oct. 11, 1887.
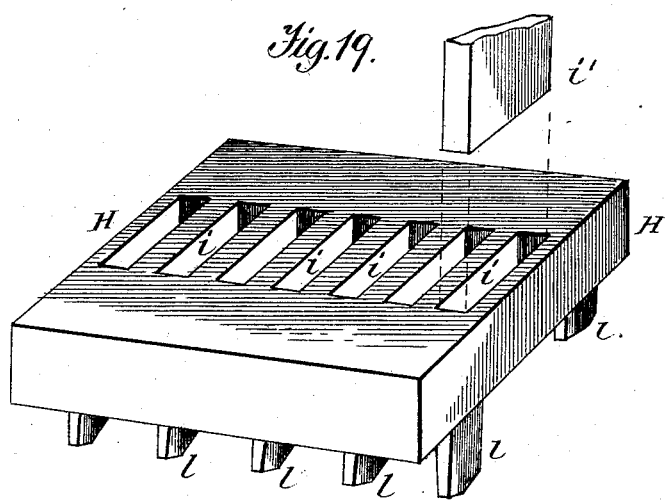
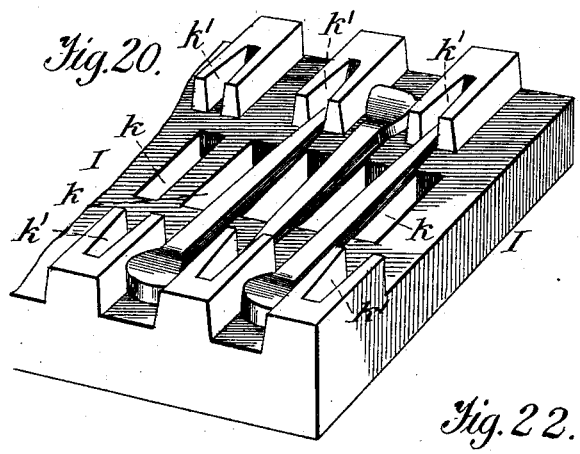
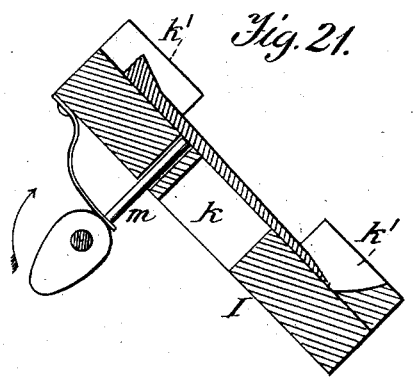
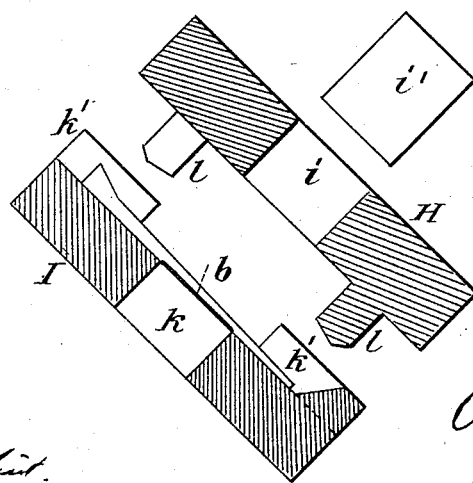
Witnesses:
A. Ruppert.
G. Frere Hunt.
Inventor:
Charles H. Burckett,
by Howard
atty.

UNITED STATES PATENT OFFICE.

CHARLES H. BURCKETT, OF BROOKLYN, NEW YORK.

MANUFACTURE OF HORSESHOE-NAILS.

SPECIFICATION forming part of Letters Patent No. 371,171, dated October 11, 1887.

Application filed July 15, 1887. Serial No. 244,363. (No model.)

*To all whom it may concern:*

Be it known that I, CHARLES H. BURCKETT, of Brooklyn, in the county of Kings and State of New York, have invented certain new and useful Improvements in the Manufacture of Horseshoe-Nails, of which the following is a specification, reference being had to the accompanying drawings, and to the letters of reference marked thereon.

The object of this invention is to facilitate and cheapen the manufacture of said nails and to improve their quality.

Figure 1 is a plan view of the nail-plate or ridged sheet of metal after it has passed through the first rolling operation. Fig. 2 is a cross-section of Fig. 1. Fig. 3 is a perspective view of the rolls first used. Fig. 4 is a plan view of the same sheet of metal after it has passed through the second rolling operation. Fig. 5 is a longitudinal section of Fig. 4. Fig. 6 is a perspective view of the rolls used in the second rolling operation. Fig. 7 is a side view of the upper of these rolls, and Fig. 8 a section thereof. Figs. 9 and 10 are perspective views showing upper and lower dies and cutting-punches used in the next stage of the process. Fig. 11 is a plan view showing the nail-plate after being subjected to the mechanism shown in Figs. 9 and 10, and also a plan of the said cutting-punches. Fig. 12 is a plan view showing the nail-plate in the next stage of the process. Fig. 13 is a perspective view of the upper die with guiding-openings for certain spreaders used therewith as employed in bringing the plate to the condition shown in Fig. 12. Fig. 14 is a transverse section of the said upper die, the spreaders used therewith, and of the lower die or bed. Fig. 15 is a longitudinal section of a part of Fig. 14, showing the upper and lower dies in section and a spreader in full lines. Fig. 16 is a detached view of a spreader. Fig. 17 is a plan view of a portion of the nail-plate, showing a series of nails detached, except from a portion of the film. Fig. 18 is a longitudinal section of Fig. 17. Fig. 19 is a perspective view of the upper die and of the cutting-punches employed in the concluding stage of the process, as hereinafter described. Fig. 20 is a perspective view of the lower die used in said stage of the process, and showing, also, a series of nails resting in said die. Fig. 21 is a view showing the lower die and an ejecting device used therewith. Fig. 22 shows the working position of the dies illustrated in Figs. 19 and 20.

Similar letters of reference indicate similar parts in the respective figures.

In carrying out my invention I take a sheet of metal, A, and pass it through suitable rolls, B B', as shown in Fig. 3, said roll B giving it the ridged formation shown in Figs. 1 and 2, $a$ being the ridges from which the nails are subsequently formed, and $b$ a film of metal left to connect the ridges. The upper roll, B, is of such formation as will give to the ridges $a$ the shape in cross-section shown in Fig. 2—that is to say, to give the sides of said ridges a slight inward incline or bevel—the object being to allow the easy working of the metal under the rolls, as will be readily understood. The sheet of metal A, having been brought to the condition shown in Figs. 1 and 2, is next passed under rolls C C', (shown in Figs. 6, 7, and 8,) so formed or arranged with irregular depressions $c$ as to give to the sheet of metal the formation shown in Figs. 4 and 5—that is to say, the ridges $a$ are given an up and-down incline, as shown in Figs. 4 and 5, $c'$ showing the part from or at which the heads of two nails are subsequently formed, and $d$ the meeting-line of the point of one of said two nails and the point of the next nail lying lengthwise to it. The part $d$ of each ridge is opposite or adjacent to the part $c'$ of the ridge lying next to it, as shown clearly in Figs. 4 and 5. The plate A, having been brought to the condition shown in Figs. 4 and 5, is next, when cold, subjected to a series of cutting-punches, D. (Shown in Figs. 9 and 10 and in plan in Fig. 11.) Each punch D works in connection with a lower die, E, having openings $e$ corresponding to the shape of the punches D, and through which openings the cuttings fall. The object of this punching action is twofold: first, to cut away a portion of the film $b$, whereby a perfect head may be formed, as hereinafter explained, and, secondly, to cut the points of the nails, as shown at $f$. The plate A, having been now brought to the condition indicated by Fig. 11, is removed from the punching-machine, again heated, and taken to a spreading-machine, now to be described. This is sufficiently shown in Figs. 13 and 14, in which F is the upper and G the lower die or bed. The upper die, F, is double, consisting of the plate $g$ and the series of spreaders $g'$. The lower die or bed, G, is simply a flat plate, and is stationary. A spreader, $g'$, detached from the upper die, F, is shown in perspective in Fig. 16, from which it will be seen that the center $g^2$, at which the heads of two nails are formed, occupies a plane higher than the ends $g^3$, at which the shank portions of the nails strictly end and the points begin. The upper die, F, is perforated, as at $f'$, so as to guide the series of spreaders $g'$, the upper die and spreaders working independently. While the upper die, F, is descending upon the nail-plate A the series of spreaders $g'$ are held stationary; but on the upper die, F, reaching the lower die or bed, G, and surrounding the parts of the nail plate from which the heads and shanks are to be formed, the series of spreaders $g'$ are moved down upon the nail-plate, the series of nails being operated upon by the spreaders to the extent comprised between the arrows $x$ $x$ of Fig. 12—that is to say, throughout the area comprised between two of the films $b$. The last-mentioned action spreads the heads of the series of nails, as shown in Fig. 12, and gives to them and the upper parts of the shanks the shape seen in longitudinal section in Fig. 18. The upper die, F, the lower die or bed, G, and the spreaders $g'$ are shown in Figs. 13, 14, 15, and 16. The perforations $f'$ of the upper die, F, are slightly beveled at $f^2$ to the height of the finished nails, as shown in Fig. 14, to allow of the ready forcing out of the nail-plate by the spreaders $g'$ acting as a stripper. Immediately after the spreaders $g'$ have completed their descent they remain stationary for an instant, and while they are stationary the upper die, F, is lifted, the spreaders $g'$ thus stripping the nail-plate A from the beveled parts $f^2$ of the upper die and leaving the plate upon the lower die or bed, G. This having been accomplished, the spreaders $g'$ are lifted.

Fig. 17 shows a section of the nail-plate A after said plate has been subjected to the hereinbefore-described various stages of the process, and has been cut by any known cutting or shearing process into detached sections, as shown in the figure, for the purpose of hardening the points of the nails and cutting away the film of metal $b$, which still holds the nails of the section in the form of a sheet.

The mechanism shown in Figs. 19, 20, and 21 is now to be employed. The upper die, H, is double—that is to say, it consists of the perforated part $i$ and the series of cutting-punches $i'$, guided by it, the upper die, H, and the series of punches $i'$ working independently of each other. The lower die, I, is provided with perforations $k$, which receive the cutting-punches $i'$ and allow the cuttings to fall through. The upper die, H, is provided with a series of compressors, $l$, one for the point of each nail, each of said compressors acting in conjunction with a socket, $k'$, of the lower die, I. The dies H and I are preferably worked at an angle of about forty-five degrees, as shown in Fig. 22, for a purpose hereinafter explained. The upper die, H, with its series of compressors $l$, having been forced against and into the lower die, I, and its series of sockets $k'$, and the points of the nails compressed and hardened, and therefore finished, while the upper die, H, is stationary, the series of cutting-punches $i'$ are forced down, cutting the films $b$, which fall through the perforations. The upper die, H, and the cutting punches having been moved back, the series of nails are then thrown out from the lower die, I, by means of an ejector, $m$, operated in any known way, the angle at which the dies are placed, as shown in Fig. 22, facilitating the throwing out of the completed nails.

I do not claim herein the mechanism hereinbefore described, as it will form the subject-matter of a separate application for Letters Patent. Neither do I now claim the nail produced as a result of the process or method herein described, as a separate application may be filed for the said nail as an improved article of manufacture.

It is seen that if the film were not cut away at the part where the head and upper part of the shank are formed the head and said part of the shank would be forced or lapped over said film by the pressure applied to form them, and that the film, which cools rapidly by reason of its thinness, would not unite with the thicker body of metal retaining greater heat, and that the result would be an imperfect nail.

Having described my invention, I claim—

1. In the manufacture of horseshoe-nails, the method hereinbefore described, consisting in forming a nail-plate into ridges separated by a film of metal, cutting or stamping out a portion of said film and forming the points of the nails by a simultaneous operation, spreading the heads and shanks of the nails while the nails are yet connected longitudinally in series, separating the nail-plate longitudinally into sections by shearing or cutting, and thereafter forming the heads and shanks, hardening the points by pressure, and cutting out the remaining film, thus completing the nail.

2. In the manufacture of horseshoe-nails, the method hereinbefore described of forming the head and shank, condensing and hardening the point, and removing the film.

3. In the manufacture of horseshoe-nails, the method hereinbefore described of first rolling the nail-plate into ridges having beveled sides, said ridges being connected by a film of metal.

4. In the manufacture of horseshoe-nails, the method hereinbefore described of rolling the nail-plate into ridges connected by a film of metal, said ridges having an up-and-down incline.

5. In the manufacture of horseshoe-nails, the method hereinbefore described of hardening the points of the series of nails while united in a sheet.

6. In the manufacture of horseshoe-nails, the method hereinbefore described of forming the head and shank of the nail by flattening out a ridge of metal having a height sufficient to afford the required metal for a head and shank of the necessary width.

7. In the manufacture of horseshoe-nails, the method hereinbefore described of hardening the points of the nails by compression, said act of compression being immediately followed by the separation of the nails by the cutting away of the uniting-film.

8. In the manufacture of horseshoe-nails, the method hereinbefore described of pointing a series of nails while united by a film of metal.

9. In the manufacture of horseshoe-nails, the hereinbefore-described method of cutting away the film from the head and shank preparatory to forming said head and shank.

In testimony whereof I have hereunto set my hand and seal.

CHARLES H. BURCKETT. [L. S.]

Witnesses:
GEORGE H. HOWARD,
GEO. F. FLINT.